(12) United States Patent
Solanki et al.

(10) Patent No.: US 11,707,712 B2
(45) Date of Patent: Jul. 25, 2023

(54) DEVICE TO REMOVE POLAR MOLECULES FROM AN AIR STREAM

(71) Applicants: Lisa Solanki, Baroda (IN); Abhinav Solanki, Baroda (IN)

(72) Inventors: Lisa Solanki, Baroda (IN); Abhinav Solanki, Baroda (IN)

( * ) Notice: Subject to any disclaimer, the term of this patent is extended or adjusted under 35 U.S.C. 154(b) by 576 days.

(21) Appl. No.: 16/964,171

(22) PCT Filed: Jan. 24, 2019

(86) PCT No.: PCT/IB2019/050590
§ 371 (c)(1),
(2) Date: Jul. 22, 2020

(87) PCT Pub. No.: WO2019/145884
PCT Pub. Date: Aug. 1, 2019

(65) Prior Publication Data
US 2021/0031140 A1 Feb. 4, 2021

(30) Foreign Application Priority Data

Jan. 27, 2018 (IN) .............................. 201821003146

(51) Int. Cl.
*B01D 53/02* (2006.01)
*B01D 53/32* (2006.01)
(Continued)

(52) U.S. Cl.
CPC ........... *B01D 53/323* (2013.01); *B01D 53/26* (2013.01); *B01D 53/8675* (2013.01);
(Continued)

(58) Field of Classification Search
CPC .. B01D 2255/20738; B01D 2255/2092; B01D 2257/106; B01D 2257/80;
(Continued)

(56) References Cited

U.S. PATENT DOCUMENTS

| 5,277,703 A * | 1/1994 | Sklenak | B01D 53/323 |
| | | | 96/96 |
| 6,203,600 B1 * | 3/2001 | Loreth | B03C 3/49 |
| | | | 264/DIG. 48 |

(Continued)

*Primary Examiner* — Christopher P Jones

(57) ABSTRACT

A device 2 to remove polar molecules like water vapor from an air stream is provided herein. The device includes a non-conductive housing 4 encapsulating a chamber 5 where the chamber 5 includes a fan 6 located at one end of the chamber 5 which allows air 24 to enter into the chamber 5, at least one metallic brush 12 is located inside a chamber and mounted on a dielectric holder 14, a curved solid wall 39 integrated with the non-conductive housing 4 at one end where the curved solid wall 39 allows smooth passage of air flow 24 from the chamber 5 and ensures minimum impingement on the brush 12, a curved wire mesh 40 integrated with the non-conductive housing 4 at the other end opposite to the curved solid wall 39, a power supply 18 to charge the metallic brush 12 and the curved wire mesh 40, where the metallic brush 12 when charged ionizes the air 24 to produce the ion current 26, facilitating removal of polar molecules from the air 24 to generate purified air 42 from the device 2.

5 Claims, 5 Drawing Sheets

(51) Int. Cl.
*B01D 53/26* (2006.01)
*B01D 53/86* (2006.01)

(52) U.S. Cl.
CPC .............. *B01D 2255/2092* (2013.01); *B01D 2255/20738* (2013.01); *B01D 2257/106* (2013.01); *B01D 2257/80* (2013.01); *B01D 2259/804* (2013.01); *B01D 2259/818* (2013.01)

(58) Field of Classification Search
CPC ........ B01D 2258/06; B01D 2259/4508; B01D 2259/804; B01D 2259/818; B01D 53/26; B01D 53/323; B01D 53/8675
See application file for complete search history.

(56) References Cited

U.S. PATENT DOCUMENTS

| | | | |
|---|---|---|---|
| 10,099,225 B2* | 10/2018 | Wennerstrom | F24F 1/022 |
| 10,807,103 B2* | 10/2020 | Loreth | B03C 3/025 |
| 2004/0013583 A1* | 1/2004 | Burkhardt | B01D 53/885 |
| | | | 422/186.3 |
| 2013/0112079 A1* | 5/2013 | Shih | B01D 53/06 |
| | | | 96/60 |
| 2015/0367280 A1* | 12/2015 | Shih | B01J 20/18 |
| | | | 96/146 |
| 2017/0198926 A1* | 7/2017 | Ota | F24F 3/1411 |
| 2020/0109869 A1* | 4/2020 | Mäkipää et al. | F24F 8/194 |

* cited by examiner

DEVICE TO REMOVE POLAR MOLECULES FROM AN AIR STREAM

BACKGROUND

Technical Field

The embodiments herein generally relate to dehumidifiers and air purifiers and more particularly to, but not limited to, removal of polar molecules such as water vapor from an air stream through the principle of di-electrophoresis and electro-hydrodynamics. The uses of the apparatus or device disclosed herein may be more extensive and not limited to simply removal of the water vapor from the air, but also may apply to the removal of any other types of polar molecules like a few polar pollutants, smoke and partially dust from other gas streams.

Description of the Related Art

Dehumidifiers are generally used in households and industries to reduce the level of humidity in the air. Dehumidifiers are usually used for health or comfort reasons, or to eliminate musty odor from closed spaces. Large dehumidifiers are also used in commercial buildings such as indoor ice rinks to control the humidity level. Dehumidifiers are also used in industrial climatic chambers to reduce relative humidity and the dew point in many industrial applications from waste and fresh water treatment plants to indoor growth rooms where the control of moisture is essential. Dehumidification within buildings can control excessive body perspiration buildup that cannot evaporate in moisture-saturated air, condensation dripping from cold-water pipes, warping and sticking of furniture and doors, mold and mildew which can cause laundry, books, and furnishings to develop mustiness, moths, fleas, cockroaches, woodlice, millipedes, and dust mites which thrive in damp conditions.

The present desiccant dehumidifiers use cold, adsorption and absorption surfaces for dehumidification. However, the surfaces are expensive and need to be discarded often or recycled by heating and require a lot of energy for maintenance. This makes them a costly proposition for long term regular operation or application. Use of refrigeration to enable water vapor removal from air has also been tried in the past, but refrigeration demands high energy consumption as well.

Thermoelectric effect-based dehumidifiers can be a cost-effective option for reducing humidity but they are limited by their capacity. Electrostatic precipitators have also been commonly used to remove particles from the air or gas streams by charging/ionizing them. They have been used to remove "mist" (droplets of water) from gas streams but not water vapor molecules. Moreover, electrostatic precipitators have high initial cost and size which limits their application.

An ionic membrane can be used to move water vapor into or out of a sealed enclosure, operating at a molecular level without involving visible liquid water. Usage of a membrane to separate water vapor from air requires the corresponding air to be compressed, which poses limitations of cost and convenience. Moreover, such fine membranes may be very expensive to manufacture. With respect to air purification, the devices available presently employ the method of using membranes or filters which need to be replaced frequently. This means a higher maintenance cost and inconvenience to the end user.

Accordingly, there remains a need for a device or technique which can be used as a cost viable, efficient and environmentally friendly solution for dehumidifying air for industrial and residential purposes. The device should also be able to purify air by removing a few polar pollutants, smoke and partially dust from an air stream.

SUMMARY

The embodiment herein provides a device to remove polar molecules such as water vapor from an air stream. The device includes a non-conductive housing encapsulating a chamber, wherein the chamber includes a fan located at one end of the chamber allowing air to enter into the chamber, at least one metallic brush located inside a chamber and mounted on a dielectric holder, wherein the metallic brushes when charged ionize the air to produce an ion current, a curved solid wall integrated with the non-conductive housing at one end, wherein the curved solid wall allows smooth passage of air flow from the chamber and ensures minimum impingement on the brushes, a curved wire mesh integrated with the non-conductive housing at the other end opposite to the curved solid wall, wherein the curved wire mesh when charged or grounded allows the flow of ion current from the metallic brushes, and a power supply to charge the metallic brushes and the curved wire mesh, facilitating removal of polar molecules such as water vapor from an air stream or the like to enable discharge of pure air from the device. In an embodiment, the curved mesh includes an exhaust fan to generate an air flow which will drain out the ion flow along with the polar molecules out of the device.

In an embodiment, the metallic brushes may be mounted at an angle on an insulating cylinder with respect to each other. The angle between the brushes would depend on but not limited to the voltage and current of the power supply, geometry of brushes, brush material etc. The fan may be preceded by an air filter to prevent dust contamination in the device.

In an embodiment, the distance between the curved mesh and the insulating cylinder may be increased or decreased depending on the configuration of the device, wherein the configuration may include but not limited to the voltage and current of the power supply, geometry and design of brushes, materials used in the device etc. In an embodiment, the metallic curved mesh is lined with additional multiple layers of finer grid sheets made from fiber material that can act as a wick These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

The embodiments herein will be better understood from the following detailed description with reference to the drawings, in which.

Figure 1:
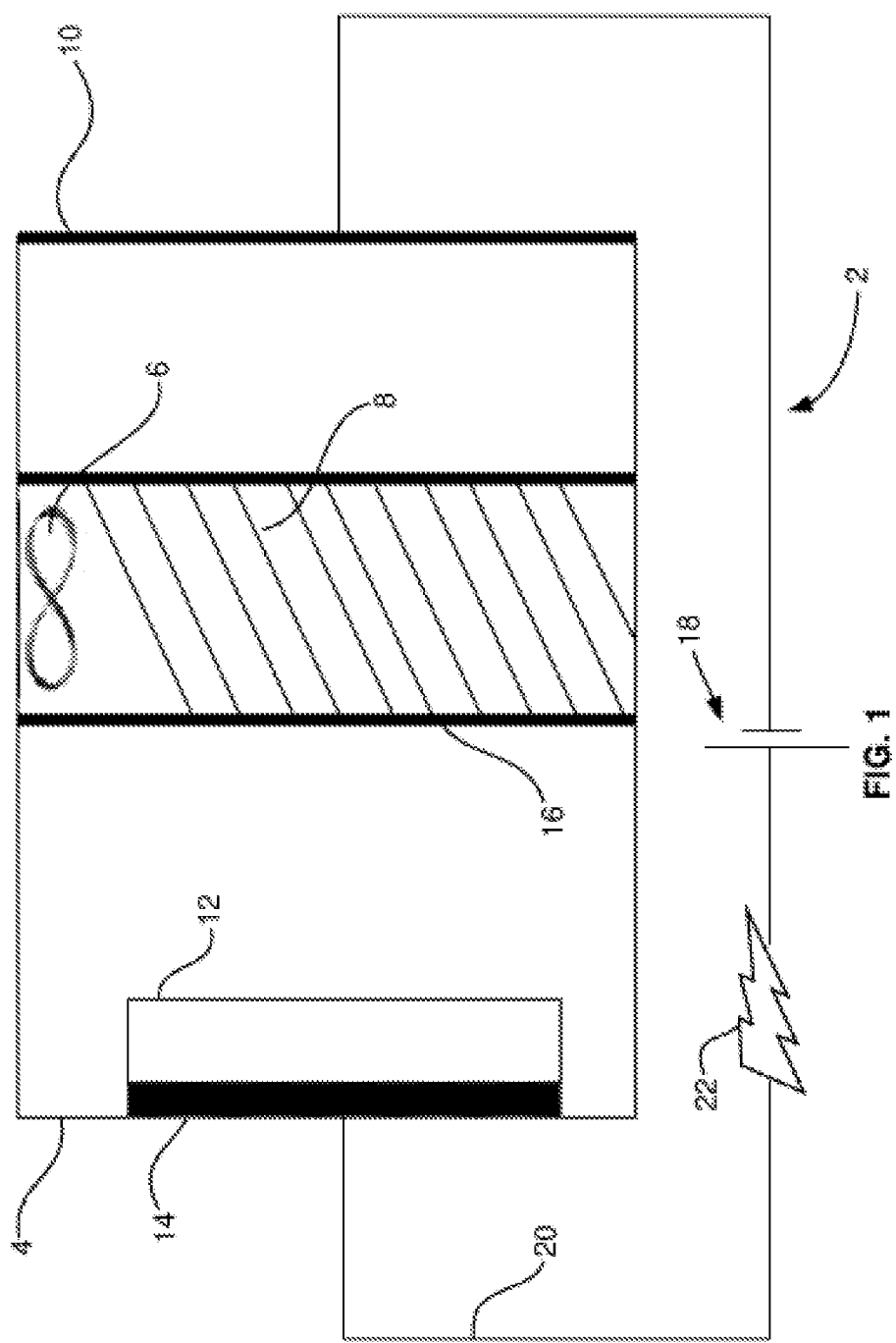
FIG. 1 illustrates a front schematic view of a device which removes polar molecules such as water vapor from an air stream according to an embodiment mentioned herein.

Persons skilled in the art will appreciate that elements in the figures are illustrated for simplicity and clarity and may not have been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAILED DESCRIPTION OF PREFERRED EMBODIMENTS

Although specific terms are used in the following description for the sake of clarity, these terms are intended to refer only to the particular structure of the invention selected for illustration in the drawings, and are not intended to define or limit the scope of the invention.

References in the specification to "one embodiment" or "an embodiment" member that a particular feature, structure, characteristics, or function described in connection with the embodiment is included in at least one embodiment of the invention. The appearances of the phrase "in one embodiment" in various places in the specification are not necessarily all referring to the same embodiment.

In the following description, for purposes of explanation and not limitation, specific details are set forth such as particular architectures, interfaces, techniques, etc. to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudo code, and the like represent various processes which may be substantially represented in computer readable medium and so executed by a computer or processor, whether such computer or processor is explicitly shown.

Accordingly, there remains a need for a device or technique which can be used as a cost viable, efficient and environmentally friendly solution for dehumidifying air for industrial and residential purposes. The device would also be capable of removing a few polar pollutants, smoke and partially dust from an air stream.

The present embodiments herein provide a dehumidifier and an air purifier that removes polar molecules such as water vapor from an air stream through the principle of di-electrophoresis and electro-hydrodynamics. The uses of the method and apparatus or device disclosed herein may be more extensive and not just limited to removal of water vapor from air but may also apply to the removal of any other types of polar molecules like a few polar pollutants, smoke and partially dust from other gas streams. Referring now to the figures, more particularly from FIG. 1 to FIG. 4, where similar reference characters denote corresponding features consistently throughout the figures, preferred embodiments are shown.

FIG. 1 illustrates a front schematic view of a device which removes polar molecules such as water vapor from an air stream according to an embodiment mentioned herein. The device 2 includes a non-conductive housing 4, a fan 6, a conducting wire mesh 10, a set of metallic brushes 12 mounted on a dielectric holder 14, a set of supports 16, a high voltage power supply 18, a set of conductors 20 and a resistor 22.

In an embodiment, a high voltage is applied using the power supply 18 with positive polarity to the brushes 12 and negative polarity or ground to the wire mesh 10, the air in the vicinity gets ionized. The corresponding ions generated move towards the wire mesh 10 because of their opposite polarity (shown in FIG. 2) as an ion current 26. In an embodiment, each of the ions carries certain number of polar molecules along because of their polar nature and this phenomenon is called as hydration of ions. Thus, air sucked in by the fan 6 will lose some polar molecules content by the time the air exits the device 2. In an embodiment, a set of conductors 20 have been used to connect the power supply terminals to the brushes 12 and the wire mesh 10.

In an embodiment, the dielectric holder 14 and the non-conductive housing 4 have been provided to ensure no parasitic corona discharge occurs. A resistor 22 has been provided to limit the current in the system in case of overload. A set of supports 16 have been provided to guide the air flow at an appropriate distance from the metallic brushes 12.

In an example embodiment, the air filter 8 has been provided to prevent dust contamination on the brush electrodes. The metallic brushes 12 may be coated with iron oxide or aluminium oxide or any other catalyst to enable breakdown of any resultant ozone to oxygen. In an example embodiment, an ultraviolet lamp maybe used additionally to prevent formation of ozone in the device 2. In an example embodiment, an electrospray maybe used additionally to increase density of ions leading to incremental hydration.

Figure 2:
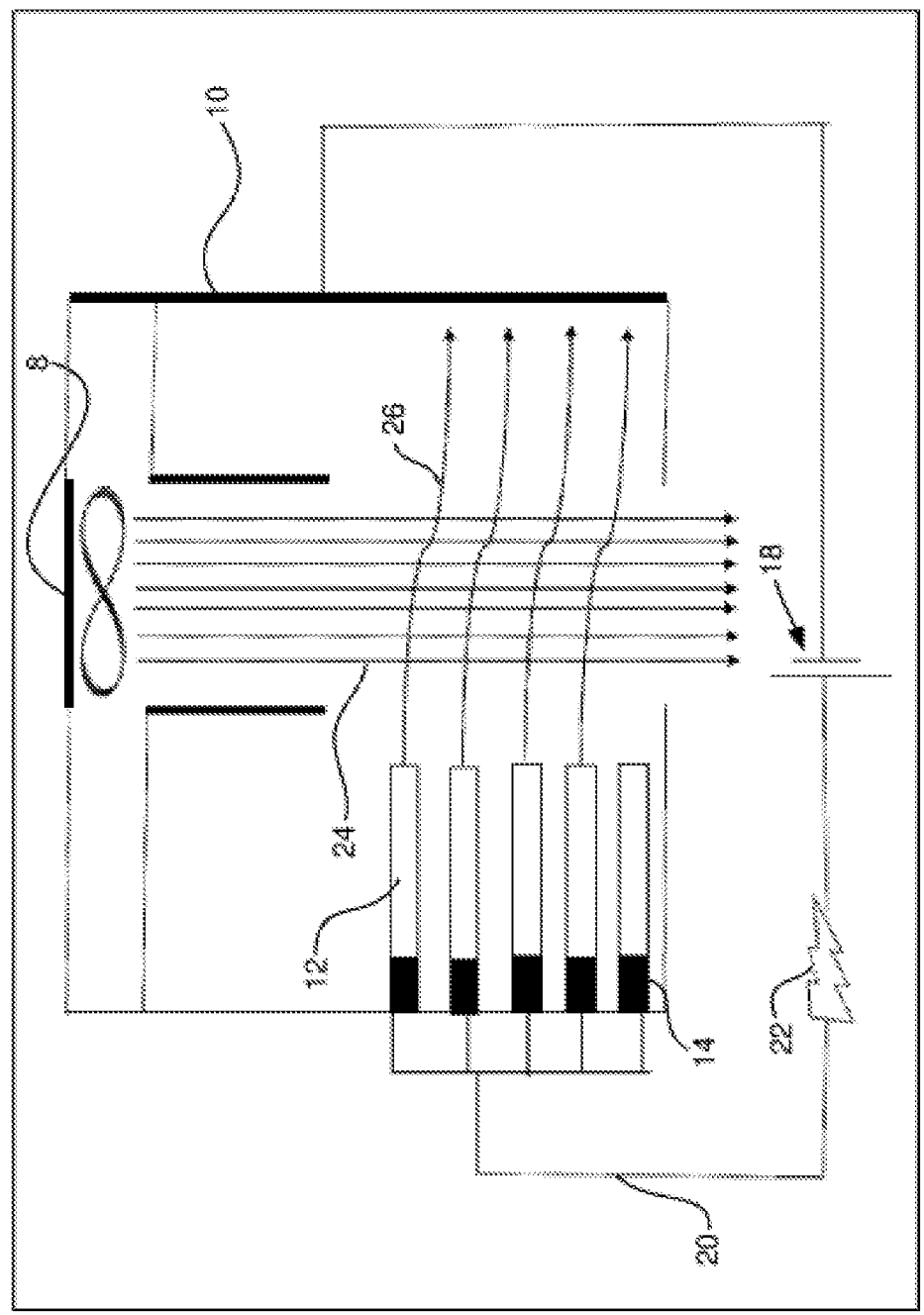
FIG. 2 illustrates a top schematic view of a device which removes polar molecules such as water vapor from an air stream according to an embodiment mentioned herein.

FIG. 2 illustrates a top schematic view of a device which removes polar molecules such as water vapor from an air stream according to an embodiment mentioned herein. The device 2 further includes an air filter 8 located on top of the fan 6. The Air filter 8 has been provided to prevent dust contamination on the brush electrodes. The air flow direction 24 is shown in the device 2.

In one embodiment, a high gradient electric field and ionization of the air for redistribution of polar molecules has been leveraged to enable drift of polar molecules, when the air is passed between a series of metallic brushes 12 and the wire mesh 10 which are connected to the high voltage device 18. Each of the ions collects certain number of polar molecules and the ions flow in a high gradient field to the oppositely charged electrode and remove the molecules from the air. The molecules will be exhausted through the wire mesh 10. The air is sucked in the device 2 by the fan 6 through the air filter 8.

In another embodiment, there may be two separate air flows for the air with and without polar molecules. The velocity of discharge air (with polar molecules) will be higher than the un-processed air (without polar molecules) to have appropriate pressure gradient for removal of the polar molecules.

In yet another embodiment, there may be an additional mesh or plate connected to negative polarity installed at the opposite end of the metallic brushes 12. The intermediary mesh would then be grounded to provide additional potential gradient for effective removal of polar molecules.

Figure 3:
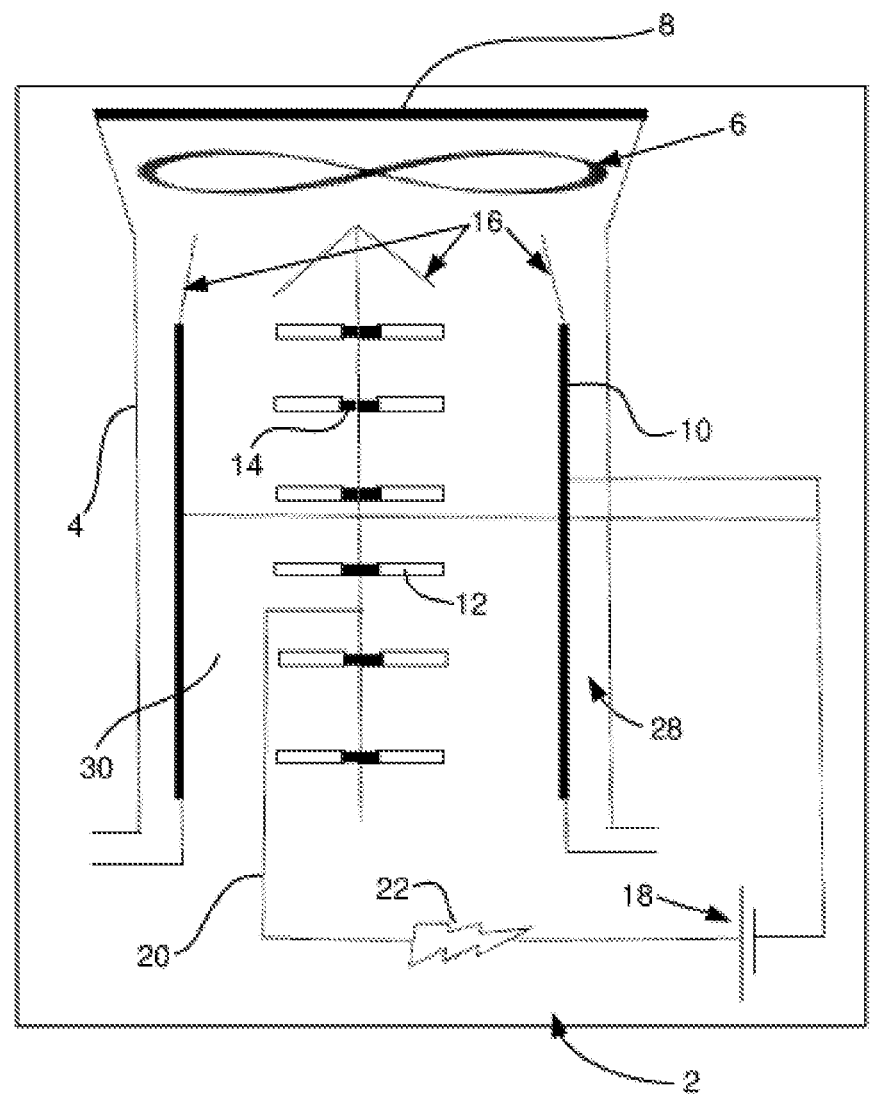
FIG. 3 illustrates an example embodiment of a top schematic view of a device which removes polar molecules such as water vapor from an air stream according to an embodiment mentioned herein.

FIG. 3 illustrates an example embodiment of a top schematic view of a device which removes polar molecules such as water vapor from an air stream according to an embodiment mentioned herein. The working principle is essentially the same as described in FIG. 1 with the application of high voltage using power supply 18 and the conductors 20 across the set of metallic brushes 12 mounted on a dielectric holder 14 and the wire mesh 10.

In addition, some amount of air sucked in by the fan 6 may be forced through a restricted space 28 with the help of the supports 16. The air pressure in the restricted space 28 will be lower than in space 30 due to difference in the velocity and flow area. This pressure gradient between the spaces 28 and 30 will help drive the ion current through the mesh 10 more effectively. The ion current will be discharged via the restricted space 28 along with the polar molecules. In an embodiment, the non-conductive housing 4 and the dielectric holder 14 prevent parasitic discharge.

Figure 4:
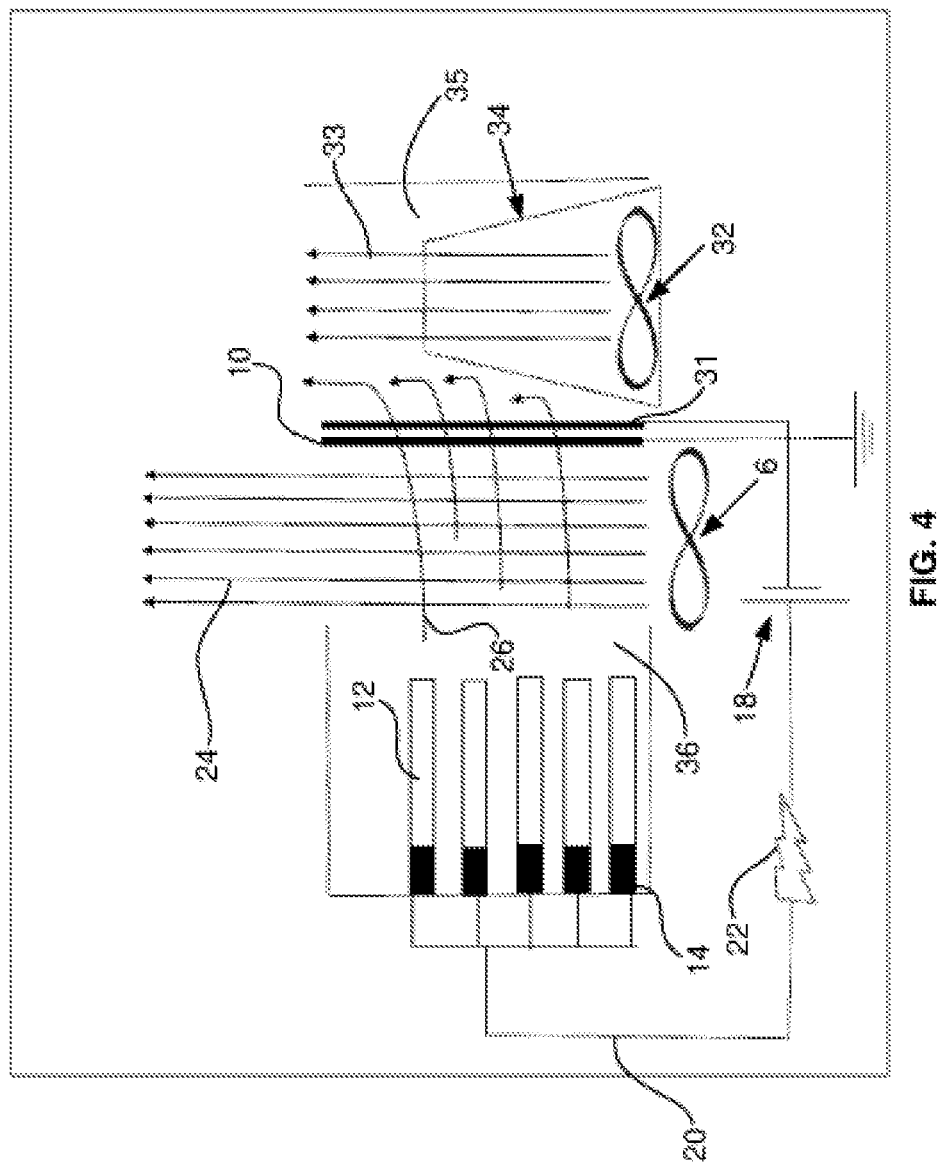
FIG. 4 illustrates yet another example embodiment of a top schematic view of a device which removes polar molecules such as water vapor from an air stream according to an embodiment mentioned herein.

FIG. 4 illustrates yet another example embodiment of a top schematic view of a device which removes polar molecules such as water vapor from an air stream according to an embodiment mentioned herein. The working principle is essentially similar as described for FIG. 1, whereby high voltage is applied using power supply 18 and the conductors 20 across the set of metallic brushes 12 mounted on a dielectric holder 14 and the wire meshes 10, 31.

In an example embodiment, the wire mesh 10 may be connected to the ground potential, whereas the wire mesh 31 may be connected to a negative polarity to enable the removal of polar molecules more effectively with higher potential gradient.

In addition, there is an exhaust fan 32 to create air flow 33 to discharge the polar molecules. In an embodiment, an air flow 33 may be appropriately channeled using a funnel 34 to ensure maximal discharge of polar molecules and minimum air flow mixing with the air flow 24. The air flow 33 may have higher velocity than the air flow 24 to create an additional pressure gradient (due to velocity difference) for effective discharge of polar molecules with the ion current 26. In an example embodiment, a cross section area of space 35 should be lower than cross section area of space 36; this is to create an additional pressure gradient (due to velocity difference) for effective discharge of polar molecules with the ion current 26.

Figure 5:
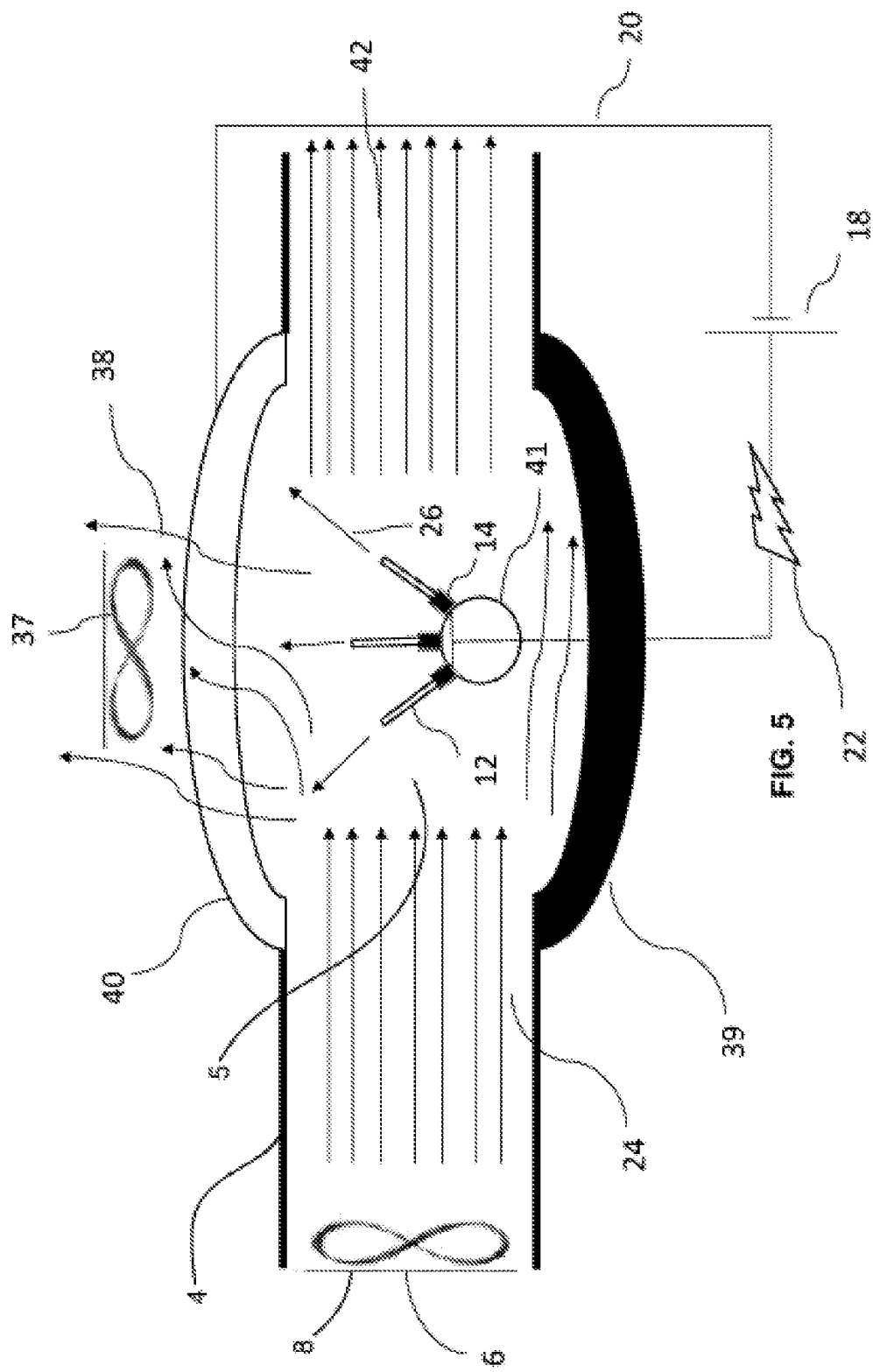
FIG. 5 illustrates yet another example embodiment of a top schematic view of a device which removes polar molecules such as water vapor from an air stream according to an embodiment mentioned herein.

FIG. 5 illustrates yet another example embodiment of a top schematic view of a device which removes polar molecules such as water vapor from an air stream according to an embodiment mentioned herein. The working principle is essentially similar as described for FIG. 1, whereby using the power supply 18, the conductors 20 and the resistor 22 a high voltage may be applied across the set of metallic brushes 12 and the wire mesh 40. In an embodiment, the metallic brushes 12 may be mounted on a dielectric holder 14. The brushes 12 are then mounted on an insulating cylinder 41. The metallic brushes 12 may be positioned at a certain angle with respect to each other.

In an embodiment, the other terminal of the power supply 18 may be connected to a metallic curved mesh 40 which has an additional multiple layers of finer grid lined sheets. In an embodiment, the finer grid lined sheets may be made from fiber material to act as a wick. The curved mesh 40 with the fine grid lined sheets ensures that the incoming air flow 24 generated by the fan 6 does not exit out of the curved mesh 40 easily and allows the air 24 to remain within the device 2.

In an embodiment, a curved solid wall 39 has been provided on opposite side of the curved mesh 40 to allow for smooth passage of the air flow 24 and ensure minimum impingement on the brushes 12. In one embodiment an exhaust fan 37 is provided behind or in proximity to the curved mesh 40 to generate an air flow 38 which will drain out the ion flow 26 along with the polar molecules out of the device 2.

Thus, the device 2 generates pure air 42 without any presence of polar molecules like water vapor. In one example embodiment, the distance between the curved mesh 40 and the insulating cylinder 41 may be increased or decreased depending on the configuration of the device 2, wherein the configuration may include but not limited to voltage, current, geometry and design of the metallic brushes, etc. and materials used in the device.

The advantageous embodiment of the present disclosure is to provide a cost viable, low energy consuming, efficient and environmentally friendly device with low maintenance cost to remove water vapor from the air stream which is not present currently in any such devices.

In an embodiment, the device 2 reduces or eliminates the issue of mold growth by dehumidifying the surrounding air and is not taught by prior art.

In one example embodiment, the device 2 provides a sustainable solution to air dehumidification without the use of harmful refrigerants and a cost viable, low energy consuming method to dehumidify air which is not taught by prior art.

In yet another object of the present disclosure provides a low operating and maintenance cost air purifier that can remove few polar pollutants, smoke and partially dust from air without the use of membranes not taught by prior art.

A method and apparatus for removing polar molecules like water vapor from an air stream by passing the air stream between two sets of electrodes with a high potential difference across them. The passing air gets ionized near one of the electrodes and the corresponding ions carry the dipole natured molecules and other charged particles in the air to the other electrode where they are discharged. In one of the embodiments, a pressure gradient is created in addition to the potential difference to make the water vapor removal process more effective. Thus, this method and apparatus for removal of water vapor may be used for removal of different polar molecules other than water vapor from various other gas streams as well.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A device to remove polar molecules from an air stream, said device comprising:
    a non-conductive housing encapsulating a chamber, that comprises a first end and a second end, wherein the chamber comprises
        a fan that is located at the first end of the chamber which allows the air stream to enter into the chamber;
        at least one metallic brush located inside the chamber and mounted on a dielectric holder, wherein the at least one metallic brush when charged ionizes the air stream to produce an ion current;
        a curved solid wall integrated with the non-conductive housing wherein the curved solid wall allows smooth passage of air from the chamber and ensures minimum impingement on the at least one metallic brush;
        a curved wire mesh integrated with the non-conductive housing opposite to the curved solid wall, wherein the curved wire mesh comprises of one or more layers of fine grid lined sheets made from fiber material wherein the one or more layers of fine grid lined sheets are adapted to act as a wick, and;
        a power supply to charge the at least one metallic brush and the curved wire mesh, wherein the at least one metallic brush when charged ionizes the air stream to produce the ion current, facilitating removal of polar molecules from the air stream to generate purified air from the device at the second end of the chamber.

2. The device of claim 1, wherein the at least one metallic brush is mounted at an angle on an insulating cylinder.

3. The device of claim 1, wherein the fan is preceded by an air filter to prevent dust contamination in the device.

4. The device of claim 1, wherein the curved wire mesh and the insulating cylinder distance with each other is increased or decreased depending on the configuration of the device, wherein the configuration comprises of at least one of parameters of voltage, current, geometry and design of the at least one metallic brush and materials used in the device.

5. The device of claim 1, wherein the curved wire mesh comprises an exhaust fan to generate an air flow which will drain out the ion current along with the polar molecules out of the device.

* * * * *